(12) United States Patent
Segev et al.

(10) Patent No.: US 11,526,300 B2
(45) Date of Patent: Dec. 13, 2022

(54) FAST WRITE ON MERKLE TREE FOR SECURE HMB

(71) Applicant: Western Digital Technologies, Inc., San Jose, CA (US)

(72) Inventors: Amir Segev, Meiter (IL); Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/236,730

(22) Filed: Apr. 21, 2021

(65) Prior Publication Data

US 2022/0342593 A1 Oct. 27, 2022

(51) Int. Cl.
*G06F 3/06* (2006.01)

(52) U.S. Cl.
CPC .......... *G06F 3/0656* (2013.01); *G06F 3/0614* (2013.01); *G06F 3/0623* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 9,418,131 B1* | 8/2016 | Halevi | G06F 16/27 |
| 2018/0074722 A1* | 3/2018 | Iwai | G06F 21/00 |
| 2020/0133566 A1* | 4/2020 | Kim | H04L 9/3247 |
| 2021/0019418 A1* | 1/2021 | Peeters | G06F 21/572 |
| 2021/0109437 A1* | 4/2021 | Oh | G03F 1/36 |
| 2021/0226772 A1* | 7/2021 | Zalivaka | G09C 1/00 |
| 2021/0397600 A1* | 12/2021 | Desai | G06F 16/24573 |

OTHER PUBLICATIONS

U.S. Appl. No. 17/210,174, filed Mar. 23, 2021, titled "Fast Initialization of Secure HMB".

* cited by examiner

*Primary Examiner* — Charles Rones
*Assistant Examiner* — Jonah C Krieger
(74) *Attorney, Agent, or Firm* — Patterson & Sheridan, LLP; Steven H. VerSteeg

(57) ABSTRACT

A data storage device includes a memory device and a controller coupled to the memory device. The controller is configured to set a decoder in data mode, read host memory buffer data and hashes from a host memory buffer, generate a first calculated hash, set the decoder in hash mode, generate a second calculated hash, and determine whether the second calculated hash is the same as a root hash. The controller is further configured to set an encoder in data mode, generate a first new hash, write new data and the first new hash to a host memory buffer, set the encoder to hash mode, calculate a second new hash, and update a root hash with the second new hash.

20 Claims, 6 Drawing Sheets

| Number of trees | Number of data entries | HMB data size [MB] | HMB total size [MB] | Capacity Utilization | Number of levels | Number of requests | Total fetched size for single entry [B] |
|---|---|---|---|---|---|---|---|
| 1 | 2097152 | 256 | 383.9 | 66.7% | 21 | 8 | 912 |
| 128 | 16384 | 256 | 383.9 | 66.7% | 14 | 6 | 688 |
| 256 | 8192 | 256 | 383.9 | 66.7% | 13 | 6 | 688 |
| 384 | 4096 | 192 | 287.9 | 66.7% | 12 | 5 | 576 |
| 384 | 8192 | 384 | 575.9 | 66.7% | 13 | 6 | 688 |
| 384 | 16384 | 768 | 1151.9 | 66.7% | 14 | 6 | 688 |
| 21 | 131072 | 336 | 503.998718 | 66.7% | 17 | 7 | 800 |
| 170 | 16384 | 340 | 509.989624 | 66.7% | 14 | 6 | 688 |
| 341 | 8192 | 341 | 511.479187 | 66.7% | 13 | 6 | 688 |

FIG. 4

FAST WRITE ON MERKLE TREE FOR SECURE HMB

BACKGROUND OF THE DISCLOSURE

Field of the Disclosure

Embodiments of the present disclosure generally relate to data storage devices, such as solid state drives (SSDs), and write operations to a Merkle Tree for a secure host memory buffer (HMB).

Description of the Related Art

The host memory buffer (HMB) is a feature utilized by data storage devices that allows a controller of the data storage device to utilize a designated portion of a host device memory, such as a host dynamic random access memory (DRAM). The HMB is allocated for the exclusive use by the controller, such that the HMB is not modified by host software until the controller releases the portion of memory back to the host device. The controller may be responsible for initializing the HMB resources. Furthermore, the HMB feature may reduce the cost of the data storage device by reducing the required size of the embedded DRAM of the data storage device. The HMB may be utilized for storing a flash translation layer (FTL) table, which includes a logical address to physical address translation. For each random read command, the controller fetches the relevant entry from the FTL table that includes the required physical address in the NAND. Then the controller fetches the data from this physical address and returns the data to the host device.

Because the HMB is an external memory to the data storage device, the data storage device may be subjected to security attacks, such as network attacks including replay attacks and/or playback attacks, by attacking the host DRAM, specifically, the HMB. A replay attack and/or playback attack is a form of network attack in which a valid data transmission is maliciously or fraudulently repeated or delayed. The replay attack and/or playback attack may either be carried out by an originator or by an adversary who intercepts the data and re-transmits it. The replay attack and/or playback attack may be part of a masquerade attack by IP packet substitution. In order to improve the security of the HMB, the data storage device may implement a Merkle Tree, where data is validated prior to writing new data to the Merkle Tree. However, because the validation process involves calculating hashes and comparing a root hash to a final calculated hash, the latency to write new data to the Merkle Tree may be large.

Thus, there is a need in the art for an improved validation and write process of data to a Merkle Tree.

SUMMARY OF THE DISCLOSURE

The present disclosure generally relates to data storage devices, such as solid state drives (SSDs), and write operations to a Merkle Tree for a secure host memory buffer (HMB). A data storage device includes a memory device and a controller coupled to the memory device. The controller is configured to set a decoder in data mode, read host memory buffer data and hashes from a host memory buffer, generate a first calculated hash, set the decoder in hash mode, generate a second calculated hash, and determine whether the second calculated hash is the same as a root hash. The controller is further configured to set an encoder in data mode, generate a first new hash, write new data and the first new hash to a host memory buffer, set the encoder to hash mode, calculate a second new hash, and update a root hash with the second new hash.

In one embodiment, a data storage device includes a memory device and a controller coupled to the memory device. The controller is configured to set a decoder in data mode, read host memory buffer (HMB) data and hashes from a host memory buffer, generate a first calculated hash, set the decoder in hash mode, generate a second calculated hash, and determine whether the second calculated hash is the same as a root hash.

In another embodiment, a data storage device includes a memory device and a controller coupled to the memory device. The controller is configured to set an encoder in data mode, generate a first new hash, write new data and the first new hash to a host memory buffer (HMB), set the encoder to hash mode, calculate a second new hash, and update a root hash with the second new hash.

In another embodiment, a data storage device includes memory means and a controller coupled to the memory means. The controller is configured to generate a first calculated hash based upon data read from a host memory buffer (HMB), generate a second calculated hash based upon the first calculated hash and HMB hash read from the HMB, and compare the second calculated hash to a root hash to determine whether a write operation has failed.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4 depicts a table illustrating a number of levels of a Merkle Tree for different host memory buffer (HMB) sizes and a number of trees, according to certain embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and write operations to a Merkle Tree for a secure host memory buffer (HMB). A data storage device includes a memory device and a controller coupled to the memory device. The controller is configured to set a decoder in data mode, read host memory buffer data and hashes from a host memory buffer, generate a first calculated hash, set the decoder in hash mode, generate a second calculated hash, and determine whether the second calculated hash is the same as a root hash. The controller is further configured to set an encoder in data mode, generate a first new hash, write new data and the first new hash to a host memory buffer, set the encoder to hash mode, calculate a second new hash, and update a root hash with the second new hash.

Figure 1:
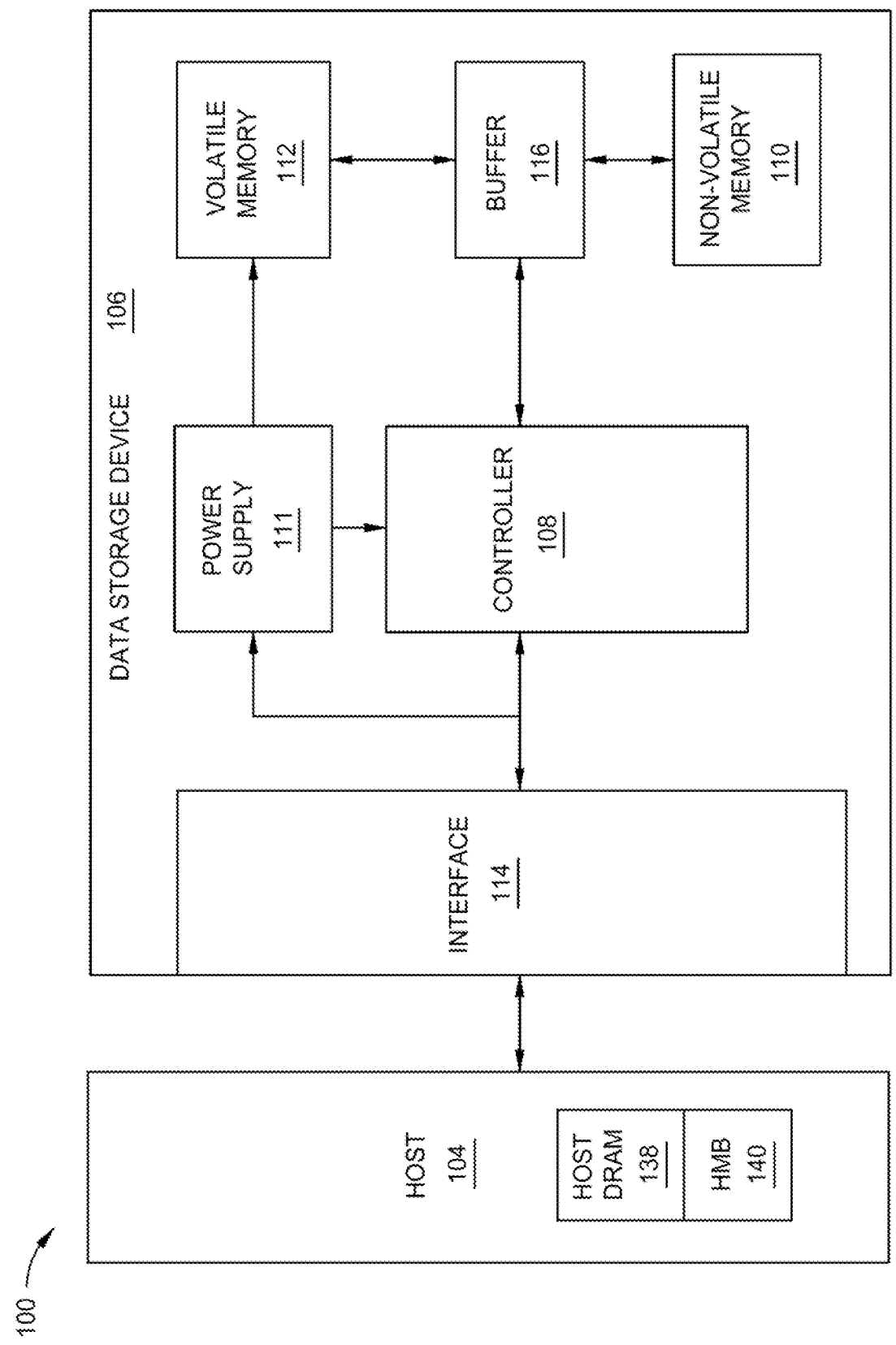
FIG. 1 depicts a schematic block diagram illustrating a storage system in which data storage device may function as a storage device for a host device, according to certain embodiments.

FIG. 1 depicts a schematic block diagram illustrating a storage system 100 in which data storage device 106 may function as a storage device for a host device 104, according to certain embodiments. For instance, the host device 104 may utilize a non-volatile memory (NVM) 110 included in data storage device 106 to store and retrieve data. The host device 104 comprises a host DRAM 138, where a portion of the host DRAM 138 is allocated as a host memory buffer (HMB) 140. The HMB 140 may be used by the data storage device 106 as an additional working area or an additional storage area. The HMB 140 may be inaccessible by the host device 104 in some examples. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, an interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The NVM 110 may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The data storage device 106 includes a power supply 111, which may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, supercapacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may include one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory or write buffer 116 before sending the data to the NVM 110. In some other embodiments, the HMB 140 may be utilized.

Figure 2:
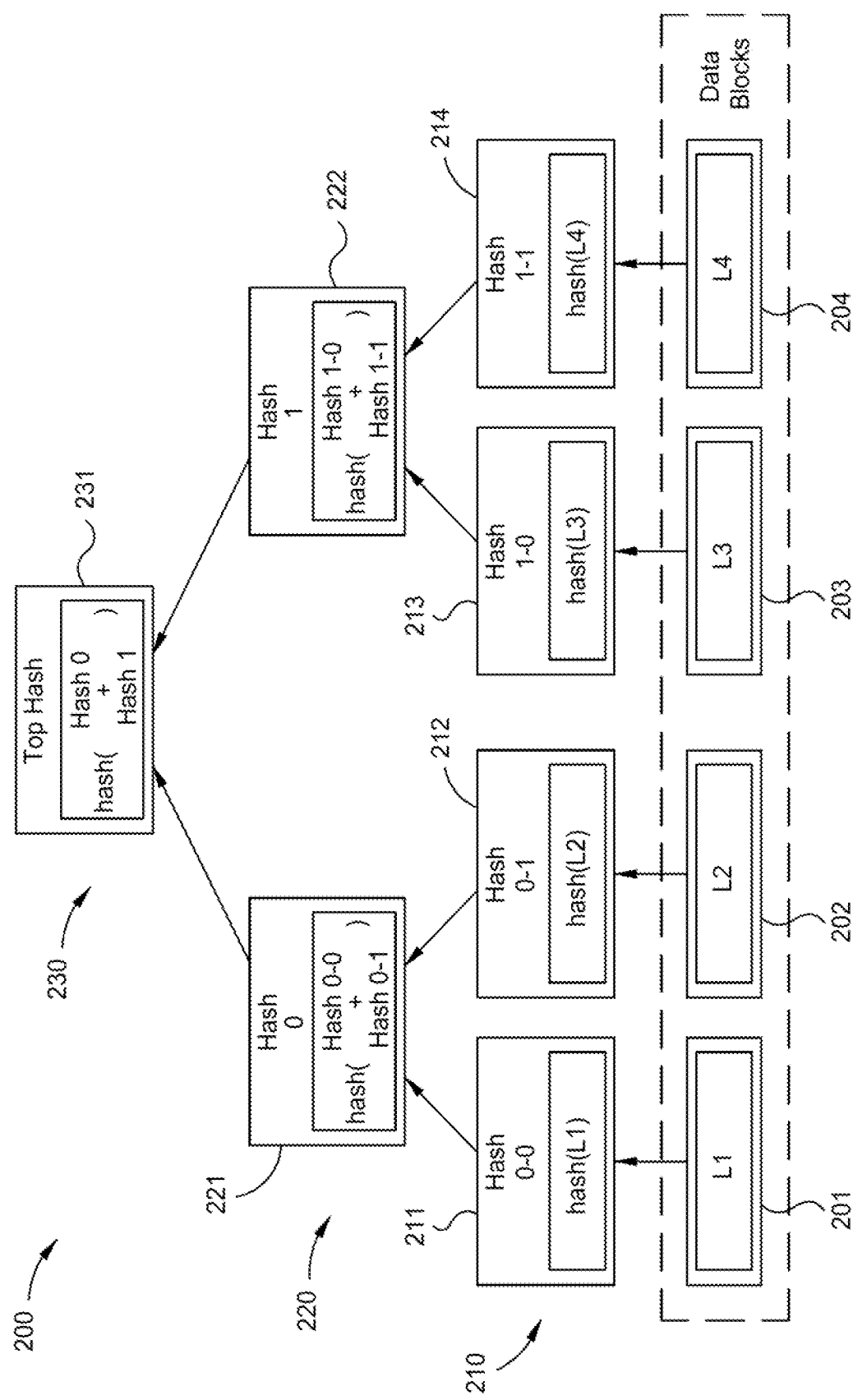
FIG. 2 depicts a schematic example of a Merkle Tree, according to certain embodiments.

FIG. 2 depicts a schematic example of a Merkle Tree 200, according to certain embodiments. The Merkle Tree 200 includes data, such as entry data that corresponds to data stored in one or more memory devices. The data is stored in a plurality of data blocks 201-204. The Merkle Tree 200 is part of a host device, such as the HMB 140 of the host device 104 of FIG. 1. The Merkle Tree 200 includes a first plurality of hashes 211-214 of a first hash level 210 and a second plurality of hashes 221, 222 of a second hash level 220. The first plurality of hashes 211-214 are created using the plurality of data blocks 201-204. Each hash of the first plurality of hashes 211-214 corresponds to a data block of the plurality of data blocks 201-204. The second plurality of hashes 221, 222 are created by combining hashes of the first plurality of hashes 211-214.

The Merkle Tree 200 includes a top level hash 231 of a top hash level 230 (i.e., a root of the Merkle Tree 200). The top hash level 230 includes a signature that is created using all of the hashes of the Merkle Tree 200. The signature of the top level hash 231 is created by combining the two hashes 221, 222 of the hash level (e.g., the second hash level 220) that is disposed immediately below the top hash level 230. The signature may include ECC data for the combined hashes. For example, the signature of the top level hash 231 may include ECC data for the two hashes 221, 222 of the second hash level 220. The top hash level 230 includes a single hash (e.g., the top level hash 231). As the Merkle Tree 200 moves upward from the plurality of data blocks 201-204 and toward the top level hash 231, the hashes of each hash level 210, 220 are progressively combined until the signature of the single top level hash 231 is created for the top hash level 230.

The Merkle Tree 200 is used to secure and validate (such as by using a validity check) a portion of a host device. Due to the progressive nature of the hash levels 210, 220, 230, the signature of the top level hash 231 is altered or corrupted if data of even one of the plurality of data blocks 201-204 is altered or corrupted, such as altered or corrupted during a network attack. The altered or corrupted signature of the top level hash 231 indicates that data of one or more of the data blocks 201-204 has been altered or corrupted. When data is written and stored in the data blocks 201-204, the Merkle Tree 200 and the signature of the top level hash 231 are created. The signature of the top level hash 231 is stored as a stored signature or a top level hash 231 signature.

The present disclosure contemplates that FIG. 2 is exemplary and can include more data blocks than the data blocks 201-204 illustrated in FIG. 2, more hash levels than the hash levels 210, 220, 230 illustrated in FIG. 2, and more hashes than the hashes 211-214, 221, 222, 231 shown in FIG. 2.

Figure 3:
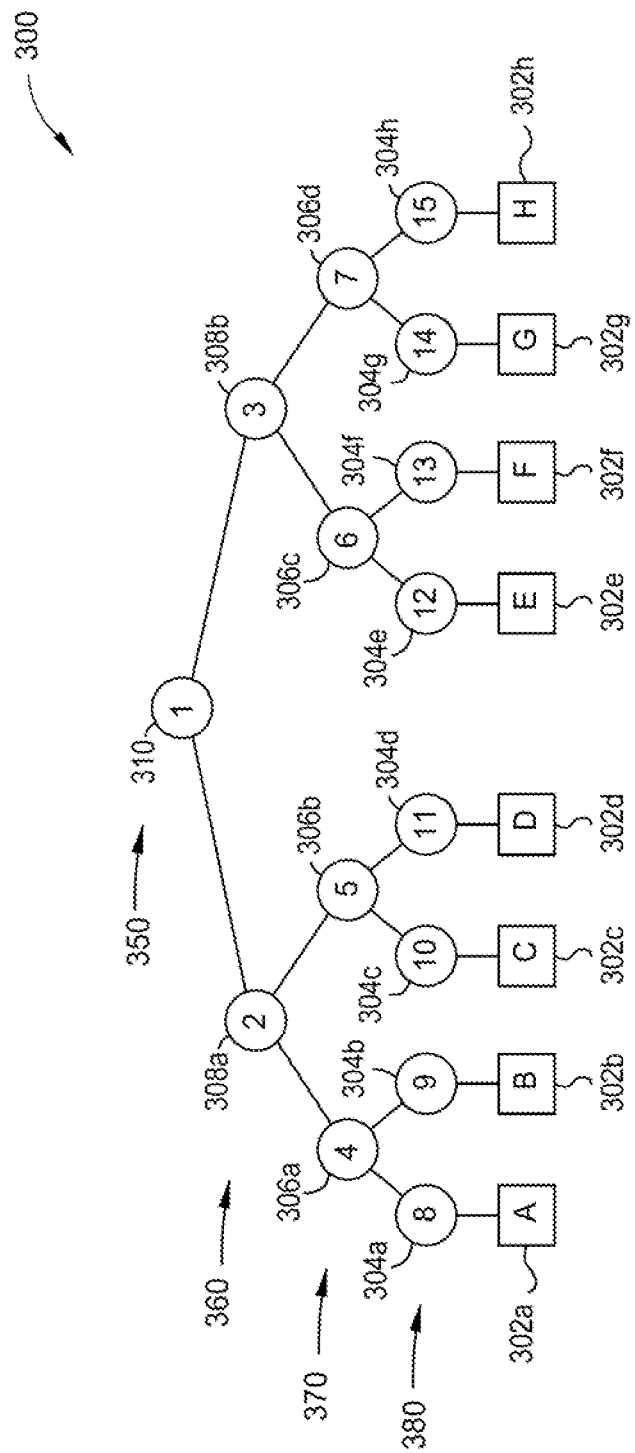
FIG. 3 depicts a schematic view of a Merkle Tree, according to certain embodiments.

FIG. 3 depicts a schematic view of a Merkle Tree 300, according to certain embodiments. The Merkle Tree 300 may be an alternative representation of the Merkle Tree 200 of FIG. 2 that includes additional hash levels, hashes, and data blocks. Referring to FIG. 3, when the Merkle Tree 300 is allocated, such as when the controller 108 of the data storage device 106 first makes a connection to the HMB 140 of the host device 104 of FIG. 1, the plurality of hashes 304a-h, 306a-d, 308a-b, 310 and the plurality of data blocks 302a-h are configured. In some examples, the term "hash" may be referred to as "node" interchangeably, for exemplary purposes.

The plurality of data blocks 302a-h may include one or more entries of a flash translation layer (FTL) table, where the FTL table is a table mapping the location of data stored in the data storage device. The controller 108 may determine a number of hash levels of the Merkle Tree 300. The Merkle Tree 300 comprises a top hash or a first hash 310 of a top hash level 350 and a number of children hashes (i.e., hashes 2-15 304a-h, 306a-d, 308a-b) in lower hash levels 360, 370, 380. The top hash 310 is coupled to a second hash 308a and a third hash 308b of the second hash level 360. Each hash of the Merkle Tree 300, excluding the hashes of a last hash level (i.e., a bottom hash level 380), are coupled to two other hashes of the lower hash level. For example, the second hash 308a is coupled to a fourth hash 306a and a fifth hash 306b of the third hash level 370. Each hash 304a-h of the bottom hash level 380 is coupled to a respective data block A-H 302a-302h.

The number of data blocks of the Merkle Tree may depend on the size of each data block, the amount of data, and the structure of the Merkle Tree. Because the Merkle Tree is a binary tree, every two hashes of a lower hash level are coupled to a hash of the level above, as previously described. For example, the amount of data allocated for the Merkle Tree may be about 512 MB, and each data block may store 128 bytes of data. The bottom hash level has 1000 hashes, where each hash is coupled to a data block. In the hash level above the bottom hash level, there are 500 hashes. The number of hashes in the above hash level is half of the number of hashes in the previous hash level. The top hash or the first hash may be considered the root of the Merkle Tree (i.e., root hash). In order to perform a write operation to a data block of the Merkle Tree, the data of the data block needs to be validated by reading the data of the data block and the relevant hashes and comparing a calculated top hash to the root hash stored. After validating the data of the data block, the data may be updated and the relevant hashes are also updated.

For example, the read flow of data block C 302c includes reading the data of data block C 302c. After reading data block C 302c, a tenth hash 304c is calculated based on data block C 302c. An eleventh hash 304d is read and the fifth hash 306b is calculated based on the tenth hash 304c and the eleventh hash 304d. The fourth hash 306a is read and the second hash 308a is calculated based on the fourth hash 306a and the fifth hash 306b. The third hash 308b is read and the top hash 310 is calculated based on the second hash 308a and the third hash 308b. The top hash 310 is then compared to an internally stored root hash value. If the top hash 310 matches the internally stored root hash value, then the data of data block C 302c is valid. Otherwise, the data of data block C 302c has been compromised.

In another example, the write flow to write new data to data block C 302c includes reading the data of data block C 302c. After reading data block C 302c, the tenth hash 304c is calculated based on data block C 302c. The eleventh hash 304d is read and stored. The fifth hash 306b is calculated based on the tenth hash 304c and the stored eleventh hash 304d. The fourth hash 306a is read and stored. The second hash 308a is calculated based on the stored fourth hash 306a and the fifth hash 306b. The third hash 308b is read and stored. The top hash 310 is calculated based on the second hash 308a and the stored third hash 308b. The top hash 310 is then compared to an internally stored root hash value. If the top hash 310 matches the internally stored root hash value, then the data of data block C 302c is valid. Otherwise, the data of data block C 302c has been compromised.

After validating the data of data block C 302c, the new data is written to data block C 302c. A new tenth hash is calculated based on the new data. The new tenth hash is written to the tenth hash 304c node. A new fifth hash is calculated based on the new tenth hash and the stored eleventh hash 304d. The stored eleventh hash 304d is released. The new fifth hash is written to the fifth hash 306b node. A new second hash is calculated based on the new fifth hash and the stored fourth hash 306a. The stored fourth hash 306a is released. The new second hash is written to the second hash 308a node. A new top hash is calculated based on the new second hash and the stored third hash 308b. The stored third hash 308b is released. The internally stored root hash is updated with the calculated new top hash.

FIG. 4 depicts a table 400 illustrating a number of levels of a Merkle Tree for different host memory buffer (HMB) sizes and a number of trees, according to certain embodiments. Based on a HMB, such as the HMB 140 of FIG. 1, configuration and size, the stored Merkle Trees, such as the Merkle Tree 300 of FIG. 3, may have a potential of having a large number of hash levels. For example, as shown in the first row, the HMB 140 includes 1 tree with 2,097,152 data entries. The HMB data size is about 256 MB with a total HMB size of about 383.9 MB. The capacity utilization is about 66.7%. Thus, the total number of hash levels is 21, where the Merkle Tree has 8 requests and a total fetched size for a single entry of 912B. Because the Merkle Tree is a binary hash tree proportional to the logarithm of the number of nodes of the Tree, the Merkle Tree has $2^{21}$ nodes or 2,097,152 data entries.

Figure 5:
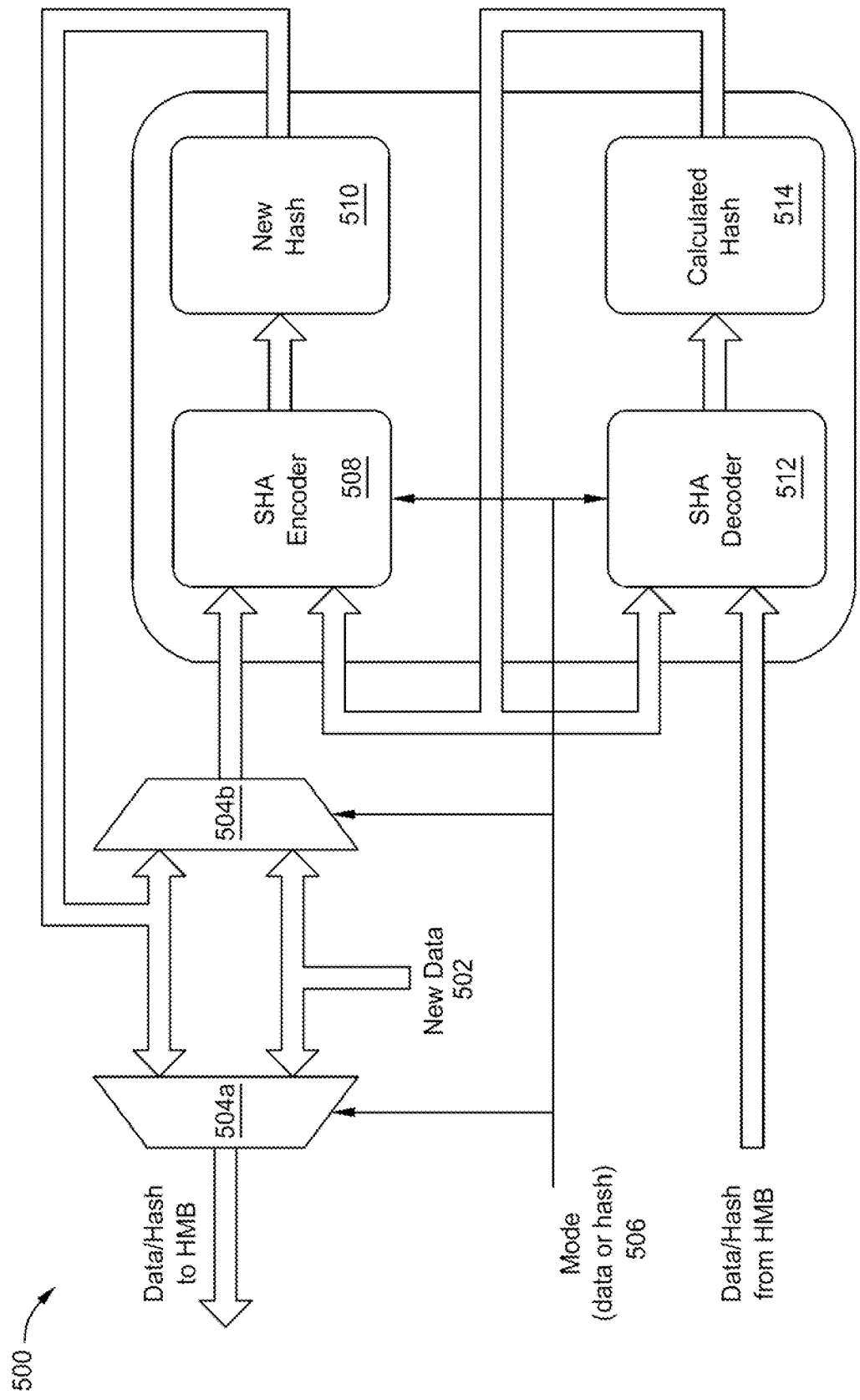
FIG. 5 depicts a schematic block diagram illustrating a secure hash algorithm (SHA) system including a SHA encoder and a SHA decoder, according to certain embodiments.

FIG. 5 depicts a schematic block diagram illustrating a secure hash algorithm (SHA) system 500 including a SHA encoder 508 and a SHA decoder 512, according to certain embodiments. The SHA system 500 may be part of a controller, such as the controller 108 of FIG. 1. For example, the controller 108 may include the SHA encoder 508 and the SHA decoder 512. The SHA system 500 includes a mode setting 506, where the mode setting 506 is either a data mode or a hash mode. Based on the mode setting 506, a left multiplexer (mux) 504a and a right mux 504b determines whether data or hashes are transferred to the SHA encoder 508, the SHA decoder 512, or the HMB 140. In one embodiment, the mode setting 506 may send separate signals to operate the SHA encoder 508 and the SHA decoder 512 in separate modes.

The SHA decoder 512 may be configured for the read flow as described in FIG. 3, where the data and hashes of a Merkle Tree, such as the Merkle Tree 300 of FIG. 3, are decoded. Based on the mode setting 506, the SHA decoder 512 may be configured to generate a calculated hash from either raw data or from a previously calculated hash and another related HMB hash from the HMB 140. For example, in a data mode, the calculated hash is generated from raw data (i.e., new data 502). In another example, the calculated hash is generated using the previously calculated hash and the another related HMB hash from the HMB 140. Likewise, the SHA encoder 508 may be configured to calculate a new hash from either the new data 502 or from a calculated hash and a previously generated new hash. The SHA encoder 508 and the SHA decoder 512 may work in parallel to generate and calculate new hashes.

Figure 6:
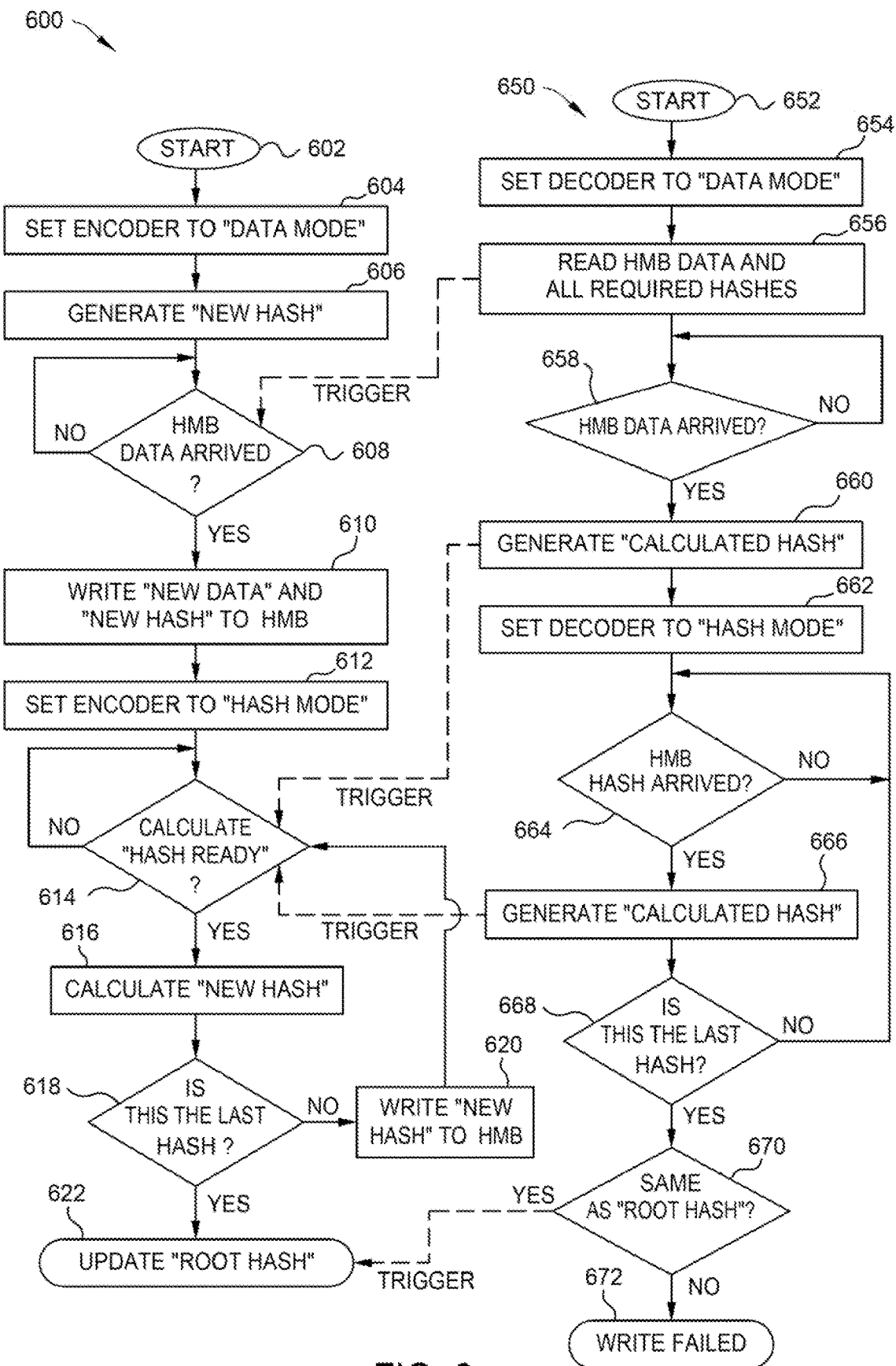
FIG. 6 depicts a flowchart illustrating a method of validating data of a Merkle Tree and a method of writing data to the Merkle Tree operating in parallel, according to certain embodiments.

FIG. 6 depicts a flowchart illustrating a method 650 of validating data of a Merkle Tree and a method 600 writing data to the Merkle Tree operating in parallel, according to certain embodiments. The method 600 and the method 650 utilizes the SHA system 500, where the method 600 relates to the SHA encoder 508 operations and the method 650 relates to the SHA decoder 512 operations. The Merkle Tree may be the Merkle Tree 300 of FIG. 3, where the Merkle Tree 300 is stored in a HMB, such as the HMB 140 of FIG. 1.

Referring the method 600, the write flow begins at block 602. At block 604, the SHA encoder 508 is placed in a data mode. The data mode may be set by a mode setting, such as the mode setting 506 of FIG. 5. At block 606, a first new hash is prepared for the new data to be written to the Merkle Tree. Prior to the block 608 step, the SHA encoder 508 waits to receive a first trigger from the SHA decoder 512. The first trigger is associated with the SHA decoder 512 reading the necessary HMB data and the required hashes at block 656. Because the SHA encoder 508 and the SHA decoder 512 accesses the same data on the HMB 140, the method 600 requires that the SHA decoder 512 reads the HMB data and all the required hashes. The triggers may be implemented to delay the write flow so that races are avoided.

At block 608, a controller, such as the controller 108 of FIG. 1, determines if the relevant HMB data has arrived from the HMB 140. If the relevant HMB data has not arrived at block 608, then the SHA encoder 508 waits to receive the relevant HMB data. After receiving the HMB data at block 608, the new data and the new hash are programmed to the HMB 140. Referring to FIG. 3, the new data may be programmed to the data block C 302c and the new hash may be programmed to the tenth hash 304c.

After writing the new data and the new hash to the HMB 140 at block 610, the SHA encoder 508 is set to a hash mode at block 612. Prior to the block 614 step, the SHA encoder 508 waits for a second trigger corresponding to generating a calculated hash at block 660 of the method 650. After receiving the second trigger, the controller 108 determines if a calculated hash from the SHA decoder 512 corresponding to the new data is ready. If the calculated hash is not ready, the SHA encoder 508 waits at block 614 until the calculated hash is ready. When the calculated hash is ready, then the SHA encoder 508 calculates a new calculated hash at block 616 using the calculated hash and the new hash (or the previously calculated new hash).

At block 618, the controller 108 determines if the calculated new hash is the last hash. The last hash refers to a top hash, such as the top hash 310 of FIG. 3. If the calculated new hash is not the last hash at block 618, then the calculated new hash is written to the HMB 140 in the respective hash location at block 620. After writing the calculated new hash to the HMB 140 in the respective node, the SHA encoder 508 waits to receive a third trigger from the SHA decoder 512. The third trigger is associated with a generated calculated hash at block 666 of the method 650. It is to be understood that the phrase "third trigger" is may refer to more than one trigger, such that a trigger is generated for each of the generated calculated hashes for the entire tree depth at block 666 of method 650. However, if the calculated new hash at block 616 is the last hash at block 618, then, once receiving a yes trigger at block 670 of the method 650, the internally stored root hash is updated at block 622.

Referring to the method 650, the write flow begins at block 652. At block 654, the SHA decoder 512 is placed in "data mode". The data mode may be set by a mode setting, such as the mode setting 506 of FIG. 5. At block 656 the HMB data and all required hashes are read. The first trigger is sent to the SHA encoder 508 to allow the SHA encoder 508 to perform block 608 in the method 600, as described above. At block 658, the controller 108 determines if the HMB data has arrived to the SHA decoder 512. If the HMB data has not arrived, then the SHA decoder 512 waits to receive the HMB data at block 658. However, if the HMB data has arrived at block 658, then at block 660, the SHA decoder 512 generates a calculated hash for the HMB data. After generating the calculated hash at block 660, the second trigger is sent to the SHA encoder 508 to perform block 614 of the method 600. At block 662, the SHA decoder 512 is set to a hash mode.

At block 664, the controller 108 determines if the relevant HMB hash has arrived (i.e., the read HMB hash, such as the read eleventh hash 304d of FIG. 3). If the relevant HMB hash has not arrived at block 664, the SHA decoder 512 waits to receive the relevant HMB hash. However, if the relevant hash has arrived at block 664, then at block 666, the relevant HMB hash and the generated calculated hash at block 660 are used to generate a new calculated hash. Once generating the new calculated hash at block 666, the third trigger is sent to the SHA encoder 508 to perform block 614 of the method 600 for additional calculated new hashes. At block 668, the controller determines if the new calculated hash is the last hash (i.e., the top hash). If the generated new hash is not the last hash at block 668, the method 650 returns to block 664, where the SHA decoder 512 waits to receive another HMB hash.

However, if the new calculated hash is the last hash at block 668, then the controller 108 determines if the new calculated hash is the same as the internally stored root hash. If the internally stored root hash and the new calculated hash are different at block 670, then the write to the HMB 140 has failed at block 672 since the new data programmed to the relevant data block may have been compromised. However, if the new calculated hash is the same as the internally root hash at block 670, then the yes trigger is sent to the SHA encoder 508 to update the internally root hash at block 622 with the new calculated hash value.

By interweaving a write operation with a read operation to write data to a Merkle Tree stored in a host memory buffer and sending triggers from the read operation to trigger write operation steps, less calculated hashes may need to be stored and the time to program new data to the Merkle Tree may be decreased. Thus, the data storage size and required power to perform the read operations and write operations may be decreased while improving latency on secure host memory buffer writes.

In one embodiment, a data storage device includes a memory device and a controller coupled to the memory device. The controller is configured to set a decoder in data mode, read host memory buffer (HMB) data and hashes from a host memory buffer, generate a first calculated hash, set the decoder in hash mode, generate a second calculated hash, and determine whether the second calculated hash is the same as a root hash.

While in the data mode, the decoder is configured to determine whether all data has been received from the HMB. While in the hash mode, the decoder is configured to determine whether all hashes have been received from the HMB. The decoder is configured to determine whether the second calculated hash is a last hash. The controller is configured to indicate that a write operation has failed when the last hash is not the same as the root hash. The first calculated hash is generated after receiving all data read from the HMB. The second, and any proceeding, calculated hash is generated after receiving an entire hash from the HMB. The controller is further configured to set an encoder in data mode, generate a first new hash with the encoder, and determine whether all HMB data has arrived at the decoder. The controller is further configured to write new data and the first new hash to the HMB, where the writing occurs after determining that all HMB data has arrived at the decoder. The controller is further configured to calculate a second new hash and write the second new hash to the HMB, wherein the second new hash is based upon the first hash and one or more second hashes. The calculating the second new hash occurs after the decoder has generated the first calculated hash and the second calculated hash. It is to be understood that calculating further hashes occurs after the decoder has generated the relevant second hash. The controller is configured to update the root hash with the second new hash after determining that the second calculated hash is the same as the root hash. Additionally, it is to be understood that the terms 'first' and 'second' are terms relative to one another. Hence, an object referred to as a 'second' can refer to the next object after the first object, and can also refer to any additional object after the first object. Thus, 'second' is understood to cover anything that is not the 'first'.

In another embodiment, a data storage device includes a memory device and a controller coupled to the memory device. The controller is configured to set an encoder in data mode, generate a first new hash, write new data and the first new hash to a host memory buffer (HMB), set the encoder to hash mode, calculate a second new hash, and update a root hash with the second new hash.

The controller is further configured to determine whether all HMB data has arrived at a decoder prior to writing the new data and new hash to the HMB. The controller is further configured to calculate the second new hash after generating a second calculated hash at a decoder. The controller is further configured to determine whether the second new hash is the last hash. The controller is further configured to write the second new hash to HMB prior to updating the root hash.

In another embodiment, a data storage device includes memory means and a controller coupled to the memory means. The controller is configured to generate a first calculated hash based upon data read from a host memory buffer (HMB), generate a second calculated hash based upon the first calculated hash and HMB hash read from the HMB, and compare the second calculated hash to a root hash to determine whether a write operation has failed.

The controller is further configured to prepare a new hash, write data associated with the new hash and the new hash to HMB, and write the new hash to the root hash upon determining the second calculated hash is equal to the root hash. The generating a first calculated hash, generating a second calculated hash, and comparing is performed by a decoder. The preparing, writing data, and writing the new hash is performed by an encoder.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, wherein the controller is configured to:
   set a decoder in data mode;
   read host memory buffer (HMB) data and hashes from an HMB;
   send a trigger to an encoder indicating that the HMB data and the hashes from the HMB have been read, wherein a write flow of the encoder is delayed until receiving the trigger;
   generate a first calculated hash;
   set the decoder in hash mode;
   generate a second calculated hash; and
   determine whether the second calculated hash is the same as a root hash.

2. The data storage device of claim 1, wherein while in the data mode, the decoder is configured to determine whether all data has been received from the HMB.

3. The data storage device of claim 1, wherein while in the hash mode, the decoder is configured to determine whether all hashes have been received from the HMB.

4. The data storage device of claim 1, the decoder is configured to determine whether the second calculated hash is a last hash.

5. The data storage device of claim 4, wherein the controller is configured to indicate that a write operation has failed when the last hash is not the same as the root hash.

6. The data storage device of claim 1, wherein the first calculated hash is generated after receiving all data read from the HMB.

7. The data storage device of claim 1, wherein the second calculated hash is generated after receiving an entire hash from the HMB.

8. The data storage device of claim 1, wherein the controller is further configured to:
   set the encoder in data mode;
   generate a first new hash with the encoder; and
   determine whether all HMB data has arrived at the decoder.

9. The data storage device of claim 8, wherein the controller is further configured to:
   write new data and the first new hash to the HMB, wherein the writing occurs after determining that all HMB data has arrived at the decoder.

10. The data storage device of claim 9, wherein the controller is further configured to:
    calculate a second new hash; and
    write the second new hash to the HMB.

11. The data storage device of claim 10, wherein calculating the second new hash occurs after the decoder has generated the first calculated hash and the second calculated hash.

12. The data storage device of claim 11, wherein the controller is configured to update the root hash with the second new hash after determining that the second calculated hash is the same as the root hash.

13. A data storage device, comprising:
    a memory device; and
    a controller coupled to the memory device, wherein the controller is configured to:
    set an encoder in data mode;
    generate a first new hash;
    receive a trigger from a decoder, wherein the trigger indicates that host memory buffer (HMB) data and hashes from an HMB have been read by the decoder;
    write new data and the first new hash to the, in response to receiving the trigger;
    set the encoder to hash mode;
    calculate a second new hash; and
    update a root hash with the second new hash.

14. The data storage device of claim 13, wherein the controller is further configured to determine whether all HMB data has arrived at the decoder prior to writing the new data and new hash to the HMB.

15. The data storage device of claim 13, wherein the controller is further configured to calculate the second new hash after generating a second calculated hash at the decoder.

16. The data storage device of claim 13, wherein the controller is further configured to determine whether the second new hash is the last hash.

17. The data storage device of claim 13, wherein the controller is further configured to write the second new hash to HMB prior to updating the root hash.

18. A data storage device, comprising:
   memory means; and
   a controller coupled to the memory means, wherein the controller is configured to:
   generate a first calculated hash based upon data read from a host memory buffer (HMB);
   generate a first trigger in response to generating the first calculated hash;
   generate a second calculated hash based upon the first calculated hash and HMB hash read from the HMB;
   generate a second trigger in response generating the second calculated hash:
   prepare a new hash when both the first trigger and the second trigger are generated; and
   compare the second calculated hash to a root hash to determine whether a write operation has failed.

19. The data storage device of claim 18, wherein the controller is further configured to:
   write data associated with the new hash and the new hash to HMB; and
   write the new hash to the root hash upon determining the second calculated hash is equal to the root hash.

20. The data storage device of claim 19, wherein the generating a first calculated hash, generating a second calculated hash, and comparing is performed by a decoder, and wherein preparing, writing data, and writing the new hash is performed by an encoder.

* * * * *